Jan. 6, 1931.   W. W. SLOANE   1,787,597
CABLE REEL LOCOMOTIVE
Filed June 4, 1928   3 Sheets-Sheet 1
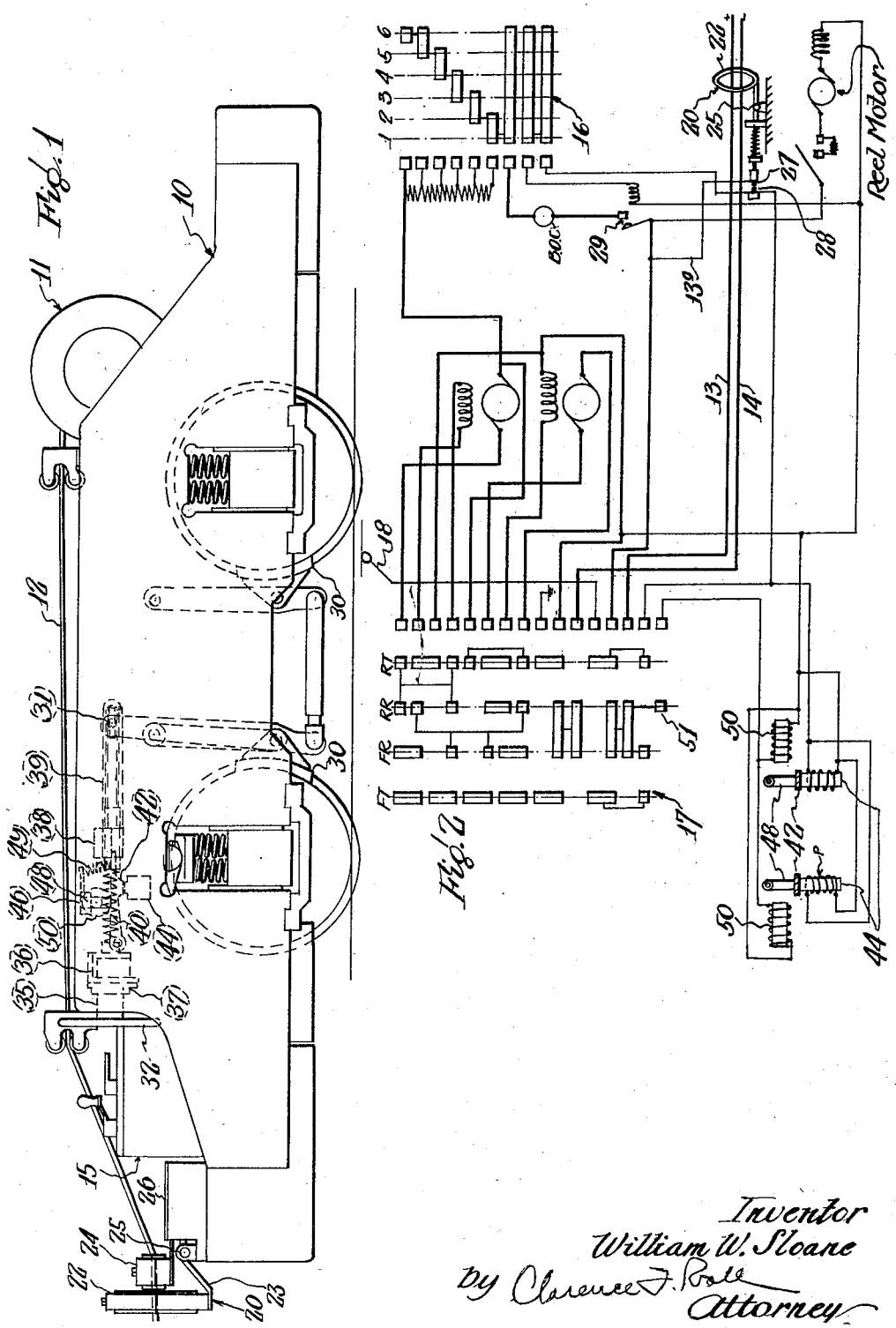
Inventor
William W. Sloane
By Clarence F. Poole
Attorney

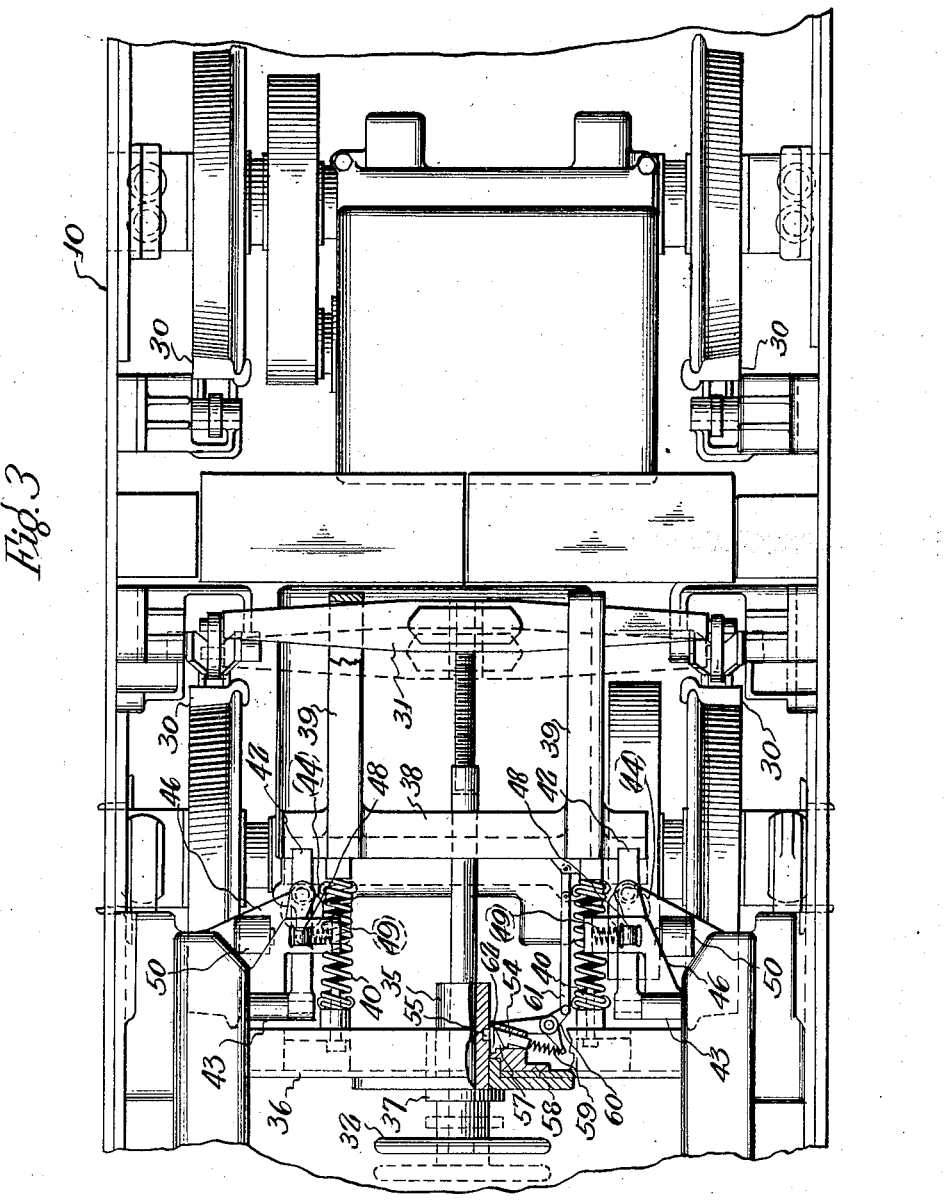

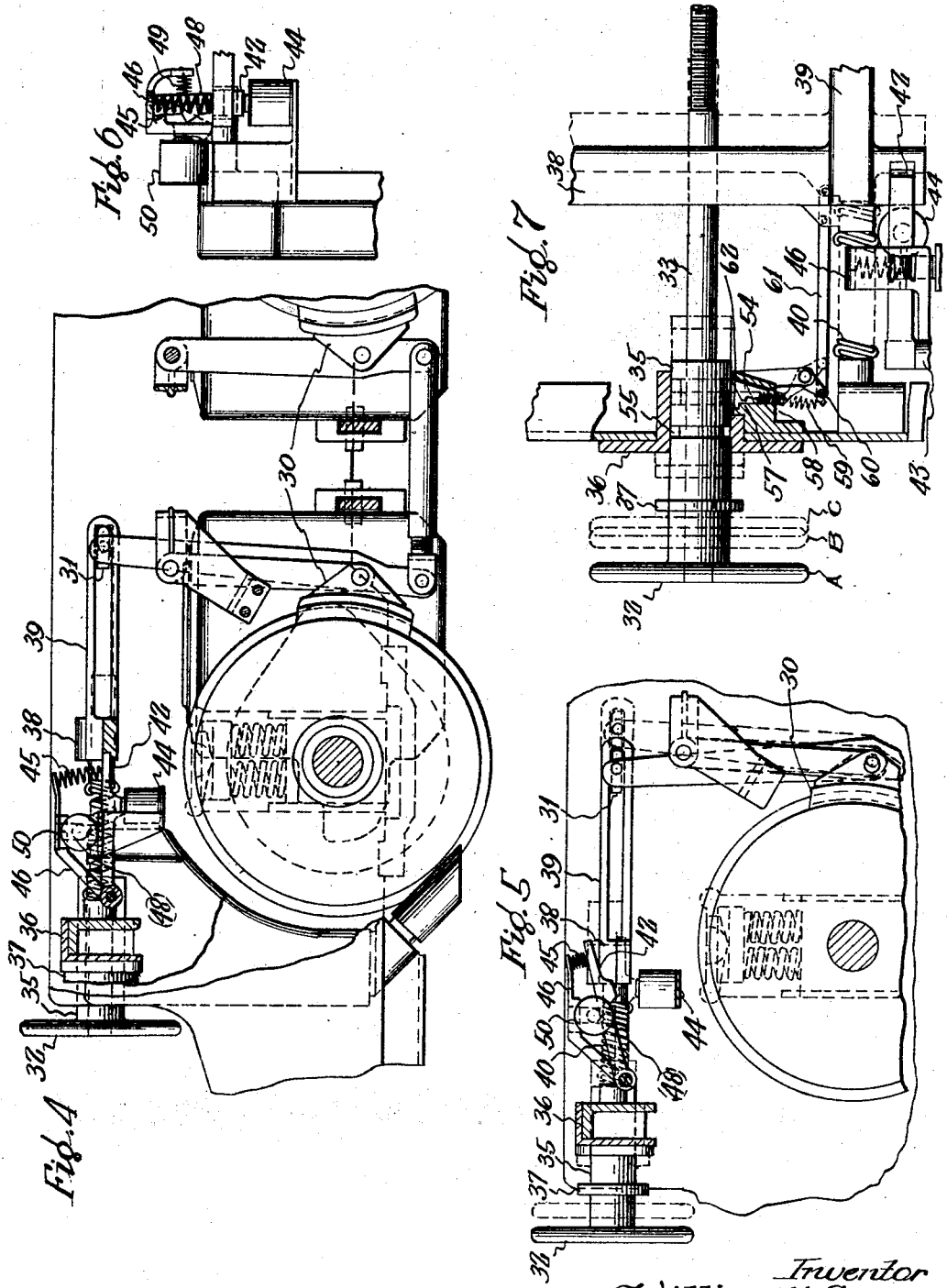

Patented Jan. 6, 1931

1,787,597

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CABLE-REEL LOCOMOTIVE

Application filed June 4, 1928. Serial No. 282,525.

This invention relates to improvements in cable reel locomotives of the type utilized in gaseous mines and has for its principal object to reduce the hazards accompanying the use of a flexible cable for conducting power to the locomotive, owing to the possibility of accidentally running over the cable while it is in use, and thereby causing an arc sufficient to cause an explosion.

The invention consists in providing a means to prevent the locomotive from running over the cable either accidentally or otherwise.

As heretofore constructed, cable reel locomotives have been provided with automatic means for paying out the cable from the reel while the locomotive is moving away from the point of connection of the cable with the main power line, and means have also been provided for positively winding up the cable on its reel while the locomotive is moving in the opposite direction. To these ends, the cable reel is normally provided with suitable braking devices so that the cable will be unwound therefrom under sufficient tension to keep the cable fairly taut along the mine track, and so as to be readily reeled in as the locomotive returns.

A separate cable reel motor is usually provided, with either automatic or manually operated control means, to wind in the cable on its reel whenever the locomotive is moving in the reverse direction toward its cable.

In the following description, the term "forward" as applied to movement of the locomotive, will be understood to mean movement away from the source of power, and when the cable is being unwound from the reel, while "reverse" movement of the locomotive will be understood to apply to movement toward its source of power connections, and in a direction to wind in the cable.

Among the hazardous conditions sought to be safeguarded by the present invention are those in which the cable is not kept taut when the locomotive is moving in reverse direction, so as to lie on the track and thus become fouled on the track ties, or other obstruction and be run over by the locomotive; or in case the locomotive slides back by gravity when upon a grade so as to run over the cable; or in case the reel motor fails to start for one reason or another when the locomotive is reversed.

A prior application, Serial Number 200,668, filed by me on June 22, 1927, provides a means for safeguarding against the aforementioned hazardous conditions. My present invention may be used to advantage with my prior invention, in that I provide a means for automatically applying the brakes on the locomotive when the cable is fouled or is otherwise placed in a dangerous position, so as to stop the locomotive before it runs over its cable.

My invention may best be understood by reference to the accompanying drawings in which:

Figure 1 is a diagrammatic view showing a locomotive with the safety devices embodied in my invention thereon;

Figure 2 is a wiring diagram of the parts of the system carried on the locomotive;

Figure 3 is a fragmentary top plan view of a locomotive having the device of my invention embodied thereon;

Figure 4 is a fragmentary side view of a locomotive with parts broken away and in section to more clearly show my invention;

Figure 5 is a fragmentary side view of a locomotive with the brakes in another position than that shown in Figure 4;

Figure 6 is an enlarged view showing details of the automatic locking mechanism for allowing the brakes to be applied or released; and Figure 7 is an enlarged view in detail of the mechanism for allowing the brakes to be reset after they have been automatically applied.

A locomotive 10 is provided with a cable reel 11 having collector rings of the usual form (not shown) thereon, and cable 12 and two conductor wires 13 and 14, insulated in the usual manner. The locomotive is also provided with a controller 15, including a resistance control drum 16 and a reverse drum 17. Such locomotives are usually provided with a trolley for use in sections of the mine having trolley wire and having sufficient ventilation to safeguard against gaseous conditions. In the form shown, a trolley 18 is provided and is connected with the reverse drum 17 whereby the main power connections may be set at will to operate on the trolley or reel.

The cable reel 11 is of the usual type employed in gathering reel locomotives and is provided with the usual friction means so that the cable is maintained under a definite tension as it is unwound from the reel. Several devices of this character are well known in the art, being usually employed in gathering reel locomotives, so that they need not be described herein in detail. The cable 12 passes from the cable reel rearwardly over the top of the locomotives guided through suitable guide rollers and through suitable means for automatically controlling the actuation of the brakes whenever the cable becomes fouled or otherwise in a dangerously abnormal condition. This control means may be responsive either to a predetermined deflection of the cable, or by failure to maintain tension thereon, as in my prior application above referred to. In the present application, the control device consists of a switch 20 responsive to angular deflections of the cable from the normal extended position to shut off current to the locomotive when the cable 12 is not in its normal extended position.

The angular deflection switch 20 is similar to that used in my prior application, Serial Number 200,668, filed June 22, 1927, and is illustrated generally in Figures 1 and 2. Said angular deflection switch comprises a ring 22 carried on an arm 23 adjacent a fixed guide 24 through which the cable 12 is trained. The arm 23 has a universal joint support 25 and extends into a flame proof casing 26, and has a contact 27 at its inner end which is adapted to register with a contact 28 mounted on the inside of the flame proof casing 26.

Figure 2 shows a contactor 29 in the positive line 13 so arranged as to cut off current in the positive line when said contactor is opened. The contactor 29 is connected with the deflector switch 20 which in turn is connected with the positive line 13 by a jumper 13ª so that breaking of the contacts 27 and 28 of the deflection switch 20 breaks the circuit through the contactor 29 and thus breaks the circuit through the positive line 13.

It will be observed that, in order to maintain the main operating circuit through the positive line 13 it is necessary not only to maintain a predetermined amount of tension on the cable 12 but also to maintain the cable in its desired extended position from the fixed guide 24, without contacting with the ring 22 of the deflection switch 20. Any desired angular clearance may be provided for the cable within the ring 22 herein a deflection of about 45° being permissible before the cable will engage the ring to break the deflection switch circuit. This permits a relatively wide range of movement of the cable with respect to the locomotive, as for instance, when the locomotive passes around track curves, but it is fairly sufficient to break the current whenever the cable is in immediate danger of being run over, as for instance, when it becomes fouled on the mine tracks or other obstructions, or whenever there is enough slack in said cable that it is in danger of being run over.

Referring now to the automatic means for applying the brakes on the locomotive 10 to prevent said locomotive from running over the cable 12 when said cable becomes fouled, it may be seen that it is only possible for the locomotive 10 to run over its cable when running in a reverse direction when it is gathering in its cable. My automatic braking device is therefore so arranged that while current will be shut off from the positive line 13 whenever the cable becomes fouled, the brakes may only be applied when the locomotive is travelling in a reverse direction.

The brakes herein shown are of the ordinary type in common use on mine locomotives whereby pressure on brake shoes 30 applied through a suitable system of levers operated by a screw device causes said shoes to bear against the locomotive wheels to stop the locomotive, and will not herein be described in detail since they are not a part of my invention. A cross beam 31 operates the brake levers and is in turn operated by a hand wheel 32 having operative connection with a threaded rod 33 which is threaded into a member 34 fixed to the cross beam 31 for moving said cross beam on rotation of the hand wheel 32. The hand wheel 32 is integral with a sleeve 35 which is supported for rotatable and slidable movement in a transverse supporting member 36. A collar 37 is integral with the sleeve 35 and is adaptable to bear against the transverse supporting member 36 when the brakes are applied by the hand wheel 32.

An auxiliary brake operating member 38 is connected with the cross beam 31 by straps 39, 39, integral therewith which surround and are slidable on the cross beam 31. Tension springs 40, 40, are interposed between the brake operating member 38 and the transverse supporting member 36. Said tension springs tend to pull the brake operating member 38 towards the transverse supporting member 36 to apply the brakes on the locomotive 10.

Means are provided for holding the brake operating member 38 in an inoperative position whereby said brake operating member may automatically have operative connection with the cross beam 31 to apply the locomotive brakes. Said holding means comprises a plurality of forwardly extending levers 42, 42, engageable with the brake operating member 38. Said levers are each pivotally mounted to members 43, 43, on each side of the locomotive frame so as to be movable about a horizontal transverse axis to engage or disengage the brake operating member 38.

An electrical magnet 44 is provided for each lever 42 to hold said lever in engagement with the brake operating member 38 and to engage said lever with said brake operating member. A tension spring 45 extends from a portion 46 of the member 43, parallel to and above the lever 42, to the lever 42 and serves to disengage the locking lever 42 from the brake operating member 38 when current is released from the electrical magnet 44.

An auxiliary locking lever 48 is provided to prevent disengagement of the lever 42 from the brake operating member 38 except when the locomotive 10 is obtaining power from its cable reel and is running in a reverse direction. The locking lever 48 (see Figure 6) depends from the portion 46 of the member 43 and is pivotally mounted to said portion to be engageable with the lever 42 to prevent movement of said lever. A spring 49 serves to engage the locking lever 48 with the lever 42 while an electrical magnet 50 serves to disengage said locking lever from the lever 42.

In Figure 2 it may be observed that the reverse drum 17 serves both as a reverse drum and as a switch to connect the locomotive circuit to either the reel or trolley. It may also be seen that current is supplied to the electrical magnets 50, 50, only when the locomotive 10 is obtaining power from the cable reel and is gathering in the cable on to said reel. Therefore, when the drum 17 is on the reverse reel position (abbreviated RR in the drawings) the electrical magnets 50, 50, will be energized by a positive electrical current from a contact 51 on the drum 17 to disengage the locking levers 48, 48, from the holding levers 42, 42, to allow said holding levers to be disengaged from the brake operating member 38 when the electrical circuit through the magnets 44, 44, is broken.

The electrical circuit through the magnets 44, 44, is broken whenever the drum 17 is on the reverse reel position and the circuit through the angular deflection switch 20 is broken due to fouling or slackness of the cable 12, since breaking of the circuit through the deflection switch 20 breaks the circuit through the contactor 29 and therefore breaks the circuit through the electrical magnets 44, 44. Current flows through the electrical magnets 44, 44, at all times when the drum 17 is on either of the trolley positions or the forward reel position and only flows through the electrical magnets 50, 50, when the drum 17 is on the reverse reel position, thus making it possible to release the holding lever 42 from the brake operating member only when the drum 17 is on the reverse reel position.

When the holding levers 42, 42, are disengaged from the brake operating member 38, the tension springs 40, 40, instantaneously move the brake operating member 38 and cross beam 31 toward the transverse supporting member 36 to apply the locomotive brakes. The threaded rod 33 and hand wheel 32 move longitudinally of the locomotive 10 in a rearward direction on movement of the cross beam 31 when the brakes are automatically applied as is illustrated in position A of Figure 7.

Means are herein provided for resetting the brakes and returning the hand wheel 32 to its operative position, as follows:

Said means comprises a pawl 54 engageable with a groove 55 in the sleeve 35 integral with the hand wheel 32 to prevent longitudinal rearward movement of the hand wheel 32, sleeve 35, and threaded rod 33. The pawl 54 is slidable transversely of the locomotive frame in a guide 57 in a member 58 fixed to the transverse supporting member 36. A spring 59 is interposed between the outer end of the pawl 54 and one lever arm of a bell crank lever 60. A connecting rod 61 connects the other lever arm of the bell crank lever 60 with the brake operating member 38, so that movement of the brake operating member 38 in one direction or the other, tends to engage or disengage the pawl 54 with the sleeve 35 and groove 55 in said sleeve.

In resetting the brakes after they have been automatically applied, the hand wheel 32 is turned in a clockwise direction until the pawl 54 engages the groove 55 on the sleeve 35 as indicated in position B of Figure 7. When the pawl 54 engages the groove 55 the hand wheel 32 is turned in a counter-clockwise direction. This will tend to move the sleeve 35 rearwardly until the pawl 54 engages a recess 62 in the rearward portion of the guide 57. The sleeve 35 and threaded rod 33 will then cease moving rearwardly, and rotation of the threaded rod 33 will move the cross beam 31 forwardly to release the pressure of the brake shoes 30 from the locomotive wheels and thus release the brakes. Forward movement of the cross beam 31 moves the brake operating member 38 forwardly therewith and applies tension to the springs 40, 40. The electrical magnets 44, 44, being disengaged by an electrical current, tend to pull the holding levers 42, 42, in engagement with the brake operating member 38 so said levers will engage their respective recesses when the brakes are fully released.

The brake operating member 38 now being held from applying the brakes, the hand wheel 32 may be turned in a clockwise direction until the collar 37 bears against the transverse supporting member 36 as indicated by position C in Figure 7, when the pawl 54 will be withdrawn from engagement with the groove 55 by means of the spring 59.

It may now be seen that I have provided a mine locomotive of the gathering type, having a cable reel thereon and having brakes which may be automatically applied when said locomotive is gathering in its conductor cable on the reel and said cable becomes slack or fouled, to prevent running over said cable. It may also be seen that said brakes may be operated by hand in any position of the drum 17 by simply turning the hand wheel 32 in one direction or the other, but that the automatic brake operating member 38 is inoperative except when the drum 17 is in the reverse reel position and the locomotive is gathering in its conductor cable.

It should be observed that when the ends of the cable 12 are being connected to the source of power that the drum 17 should be on the forward reel position to prevent the weight of the cable 12 on the ring 22 of the angular deflection switch 20 from throwing on the brakes. Similarly, when it is desired to gather in the cable 12, the cable reel 11 must start to wind in the cable 12 before the locomotive is started on its rearward journey. The purpose of starting the cable reel 11 to wind in, before starting the locomotive is to take up all slack on the cable 12 to prevent said cable from bearing on the ring 22 to apply the brakes.

Thus, all slack must be taken up on the cable 12 before the locomotive may start on its rearward journey to gather in its cable. This prevents the locomotive from starting and running over any slack cable which may be on the track to the rear of the locomotive.

Although I have shown and described one embodiment of my invention, it will be understood that the construction or arrangement of the various parts may be altered or changed and that other means may be used to break the electrical circuit through the locomotive than are shown without departing from the spirit and scope thereof. Furthermore, I do not wish to limit myself to the form illustrated, excepting as it may be limited in the appended claims.

I claim as my invention:

1. In combination with a cable reel locomotive, an electric cable, braking devices for said locomotive, and electrically controlled means on said locomotive responsive to a predetermined deflection on said cable for automatically applying said braking devices to stop said locomotive.

2. In combination with a cable reel locomotive, a cable, braking devices for said locomotive, and means on said locomotive responsive to a predetermined deflection on said cable for simultaneously cutting off power from said locomotive and automatically applying said braking devices to stop said locomotive.

3. In combination with a cable reel locomotive, a cable, braking devices for said locomotive, said braking devices including brake shoes engageable with said locomotive wheels, manually operated means for engaging said brake shoes with said locomotive wheels, and automatic means responsive to lack of tension in said cable for engaging said brake shoes with said locomotive wheels.

4. In combination with a cable reel locomotive, a cable, braking devices for said locomotive, said braking devices including brake shoes engageable with said locomotive wheels, manually operated means for engaging said brake shoes with said locomotive wheels, and automatic means operable by said cable when said cable is in a dangerous position for engaging said brake shoes with said locomotive wheels to apply said brakes to stop said locomotive.

5. In combination with a cable reel locomotive, a cable, braking devices for said locomotive, said braking devices including brake shoes engageable with said locomotive wheels, manually operated means for engaging or disengaging said brake shoes with said locomotive wheels, and auxiliary automatic spring operated means responsive to lack of tension in said cable for engaging said brake shoes with said locomotive wheels.

6. In combination with a cable reel locomotive, a cable, braking devices for said locomotive, said braking devices including brake shoes engageable with said locomotive wheels, manually operated means for engaging or disengaging said brake shoes with said locomotive wheels, and auxiliary automatic means for engaging said brake shoes with said locomotive wheels responsive to lack of tension in said cable and operable on breaking of potential in said locomotive.

7. In combination with a cable reel locomotive, a cable, braking devices for said locomotive, said braking devices including brake shoes engageable with said locomotive wheels, manually operated means for engaging or disengaging said brake shoes with said locomotive wheels, auxiliary automatic means for engaging said brake shoes with said locomotive wheels, and means operable by lack of tension of said cable for releasing said auxiliary automatic means for applying said brakes.

8. In combination with a cable reel locomotive, a cable, braking devices for said locomotive, said braking devices including brake shoes engageable with said locomotive wheels, manually operated means for engaging or disengaging said brake shoes with said locomotive wheels, auxiliary automatic means for engaging said brake shoes with said locomotive wheels, and electrical means operable by lack of tension of said cable for releasing said auxiliary automatic means for applying said brakes.

9. In combination with a cable reel locomotive, a cable reel, a cable thereon, braking devices for said locomotive, said braking devices including brake shoes engageable with said locomotive wheels, manually operable means for engaging or disengaging said brake shoes with said locomotive wheels, auxiliary automatic means for engaging said brake shoes with said locomotive wheels, tension means for actuating said auxiliary automatic brake operating means, and a combination of electrical and mechanical means responsive to lack of tension on said cable when said locomotive is travelling in a direction toward its source of power and said cable reel is winding in said cable for releasing said auxiliary automatic means for applying said brakes.

10. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, and a brake operating member connectible with said tension means and said cross beam for applying said brakes.

11. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, and a locking device for holding said brake operating member in an inoperative position.

12. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, an electrically controlled locking device for holding said brake operating member in an inoperative position and operable to release said brake operating member to apply said brakes when said locomotive is travelling toward the source of power and is gathering in said cable.

13. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, and electrical controlled locking devices for holding said brake operating member in an inoperative position and operable to release said brake operating member to apply said brakes when said locomotive is travelling toward its source of power and is gathering in its conductor cable, said locking devices comprising a plurality of locking levers and a plurality of electrical magnets for holding said locking levers in engagement with said brake operating members.

14. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, and electrical controlled locking devices for holding said brake operating member in an inoperative position and operable to release said brake operating member to apply said brakes when said locomotive is travelling toward its source of power and is gathering in its conductor cable, said locking devices comprising a plurality of locking levers, a plurality of electrical magnets for holding said locking levers in engagement with said brake operating members, and a plurality of auxiliary locking devices for preventing release of said first named locking levers except when said locomotive is travelling toward its source of power and gathering in its cable.

15. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, and electrical controlled locking devices for holding said brake operating member in an inoperative position and operable to release said brake operating member to apply said brakes when said locomotive is travelling toward its source of power and is gathering in its conductor cable, said locking devices comprising a plurality of locking levers, a plurality of electrical magnets for holding said locking levers in engagement with said brake operating members, and a plurality of auxiliary locking devices for preventing release of said first named locking levers except when said locomotive is travelling toward its source of power and gathering in its cable, said auxiliary locking devices comprising a lever engageable with each of said first mentioned locking devices, and an electrical magnet for disengaging said lever from said first mentioned locking lever.

16. In combination with a cable reel locomotive, a cable, braking devices for said locomotive, means on said locomotive responsive to lack of tension on said cable for automatically applying said braking devices to stop said locomotive comprising a cross beam connectible with said braking devices for applying or releasing the brakes tension means, a brake operating member connectible with said tension means and said cross beam, and electrical controlled locking devices for holding said brake operating member in an inoperative position and operable to release said brake operating member to apply said brakes when said locomotive is travelling toward its source of power and is gathering in its conductor cable, said locking devices comprising a plurality of locking levers, a plurality of electrical magnets for holding said locking levers in engagement with said brake operating members, and a plurality of auxiliary locking devices for preventing release of said first named locking levers except when said locomotive is travelling toward its source of power and gathering in its cable, said auxiliary locking devices comprising a lever engageable with each of said first mentioned locking devices including spring means for engaging said auxiliary locking levers with said locking devices and electrical magnetic means for disengaging said auxiliary locking levers with said first mentioned locking devices.

17. In combination with a cable reel locomotive, a cable, braking devices for said locomotive, said braking devices including brake shoes engageable with said locomotive wheels, automatic means for engaging said brake shoes with said locomotive wheels comprising a cross beam connectible with said braking devices, automatic spring actuated means for moving said cross beam and engaging said brake shoes with said locomotive wheels, manually operated means connectible with said cross beam for engaging said brake shoes with said locomotive wheels, said manually operable means being movable longitudinally of said locomotive on application of said brakes by said automatic brake operating means, and interlocking means connectible with said automatic brake operating means, and said manual brake operating means for allowing said brake shoes to be released from said locomotive wheels and for allowing said manual brake operating means to be returned to its operative position.

18. In combination with a cable reel locomotive, a cable, braking devices for said locomotive, said braking devices including brake shoes engageable with said locomotive wheels, automatic means for engaging said brake shoes with said locomotive wheels comprising a cross beam connectible with said braking devices, automatic spring actuated means for moving said cross beam and engaging said brake shoes with said locomotive wheels, manually operated means connectible with said cross beam for engaging said brake shoes with said locomotive wheels, said manually operable means being movable longitudinally of said locomotive on application of said brakes by said automatic brake operating means, and interlocking means connectible with said automatic brake operating means and said manual brake operating means for allowing said brake shoes to be released from said locomotive wheels and for allowing said manual brake operating means to be returned to its operative position, said interlocking means comprising a pawl engageable with said manual brake operating means, and operable by said automatic brake operating means.

Signed at Chicago, in the county of Cook and State of Illinois, this 1st day of June, A. D. 1928.

WILLIAM W. SLOANE.